(12) United States Patent
Zhou et al.

(10) Patent No.: US 9,857,706 B2
(45) Date of Patent: Jan. 2, 2018

(54) ELECTROPHOTOGRAPHIC RECORDING MEDIA

(75) Inventors: Xiaoqi Zhou, San Diego, CA (US); Christine E. Steichen, Escondido, CA (US); Xulong Fu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 688 days.

(21) Appl. No.: 13/982,198

(22) PCT Filed: Jan. 31, 2011

(86) PCT No.: PCT/US2011/023216
§ 371 (c)(1),
(2), (4) Date: Jul. 26, 2013

(87) PCT Pub. No.: WO2012/105944
PCT Pub. Date: Aug. 9, 2012

(65) Prior Publication Data
US 2013/0323504 A1 Dec. 5, 2013

(51) Int. Cl.
*G03G 5/10* (2006.01)
*C08K 3/26* (2006.01)
*B05D 5/00* (2006.01)
*B32B 27/10* (2006.01)
*G03G 7/00* (2006.01)
(Continued)

(52) U.S. Cl.
CPC ............. *G03G 7/002* (2013.01); *B32B 27/10* (2013.01); *B32B 27/20* (2013.01); *B32B 27/32* (2013.01); *C08K 3/26* (2013.01); *G03G 7/004* (2013.01); *G03G 7/0013* (2013.01);
(Continued)

(58) Field of Classification Search
CPC .. C08K 2003/265; C08K 3/26; C08K 5/0016; C08K 5/09; C08L 23/06; C08L 2666/24; C08L 2666/34; B32B 27/18; B32B 27/22; B32B 27/20; B32B 27/308; B32B 27/32;
(Continued)

(56) References Cited

U.S. PATENT DOCUMENTS 4,318,950 A * 3/1982 Takashi ................. B29C 43/305
206/459.5
4,396,671 A 8/1983 Wanka et al.
(Continued)

FOREIGN PATENT DOCUMENTS

EP 1400861 3/2004
JP 2004299337 A * 10/2004
WO WO2006/060217 6/2006

OTHER PUBLICATIONS

"A Consumer Guide to Modern Photo Papers", created by Image Permanence Institute in support from Sakura of America, Jan. 2009, Entire document.*
(Continued)

*Primary Examiner* — Monique Jackson
(74) *Attorney, Agent, or Firm* — HP Inc. Patent Department (57) ABSTRACT

An electrophotographic recording media containing a base substrate coated on at least one side with an image-receiving layer that contains a polymeric polyolefin resin and more than about 20 wt % of inorganic pigments dispersed into said resin. Also disclosed is a method of 5 making such recording media and process for producing an image on said electrophotographic recording media.

13 Claims, 1 Drawing Sheet

(51) Int. Cl.
  *B32B 27/32* (2006.01)
  *B32B 27/20* (2006.01)
  *G03G 13/20* (2006.01)

(52) U.S. Cl.
  CPC .......... *G03G 7/0086* (2013.01); *G03G 13/20* (2013.01); *Y10T 428/277* (2015.01); *Y10T 428/31902* (2015.04)

(58) Field of Classification Search
  CPC .............. B32B 27/10; C09D 123/0869; C09D 123/147; C09D 123/26; C09D 151/06
  See application file for complete search history.

(56) References Cited

U.S. PATENT DOCUMENTS

| | | |
|---|---|---|
| 4,481,289 A | 11/1984 | Honma |
| 5,145,749 A | 9/1992 | Matthew |
| 5,328,749 A | 7/1994 | Nada et al. |
| 5,451,561 A | 9/1995 | Campbell et al. |
| 6,190,781 B1 | 2/2001 | Tsubaki et al. |
| 6,544,709 B1 | 4/2003 | Wanc et al. |
| 7,402,365 B1 | 7/2008 | Bailey et al. |
| 2003/0219610 A1 | 11/2003 | Aylward et al. |
| 2003/0235683 A1 | 12/2003 | Tamagawa et al. |
| 2004/0058176 A1* | 3/2004 | Nakamura ............. G03G 7/004 428/515 |
| 2005/0042426 A1* | 2/2005 | Kamiyama ............. B41M 5/52 428/195.1 |
| 2006/0046030 A1* | 3/2006 | Shiba .................. G03G 7/0006 428/195.1 |
| 2006/0058188 A1 | 3/2006 | Tamagawa |
| 2006/0115627 A1 | 6/2006 | Dontula et al. |
| 2006/0251866 A1 | 11/2006 | Zhou et al. |
| 2007/0031615 A1* | 2/2007 | Nair ...................... B41M 5/502 428/32.38 |
| 2008/0241483 A1 | 10/2008 | Verhoeven et al. |
| 2009/0076212 A1* | 3/2009 | Lewtas .................. B32B 27/32 524/505 |
| 2010/0003427 A1 | 1/2010 | Overberg et al. |
| 2010/0218887 A1 | 9/2010 | Vreeland |
| 2011/0244214 A1* | 10/2011 | Steichen ................ B32B 27/10 428/304.4 |

OTHER PUBLICATIONS

"Color Materials Usage Guide", Xerox, 2000, Entire document, particularly pp. 4-31.*

* cited by examiner

ELECTROPHOTOGRAPHIC RECORDING MEDIA

BACKGROUND

In recent years, consumers and businesses have turned to electrophotographic printing systems to produce digital images on a variety of substrates. Such printing systems are using liquid or dry toner electrophotographic imaging devices, such as laser printers. With the rapid development of this digital technology, traditional monochromatic electrophotographic printing has thus gradually been replaced by full color, high image quality electrophotographic printing, e.g. using color copiers and color laser printers. Electrophotographic printing technology enables the making of good quality in-house prints on-demand without requiring professional skills such as those skills used to perform conventional offset printing (lithographic printing) in a printing house.

It has rapidly become apparent that the image quality of images printed using such printing technology is strongly dependent on the construction of the recording media used. Consequently, improved recording media, often specifically designed, has been developed for use in electrophotographic printing devices. However, while many developments have been made, it has often created challenges to find recording media which can be effectively used with electrophotographic printing techniques and which have good image quality.

BRIEF DESCRIPTION OF THE DRAWING

The drawings illustrate various embodiments of the present system and method and are part of the specification.

DETAILED DESCRIPTION

Before particular embodiments of the present invention are disclosed and described, it is to be understood that the present disclosure is not limited to the particular process and materials disclosed herein. It is also to be understood that the terminology used herein is used for describing particular embodiments and is not intended to be limiting. In describing and claiming the present disclosure, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. Wt % means herein percentage by weight. All percents are by weight unless otherwise indicated.

As used herein, "images" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

The present disclosure relates to a recording media including a base substrate coated on, at least, one side with an image-receiving layer that contains a polymeric polyolefin resin and more than about 20 wt % of inorganic pigments dispersed into said resin. The recording media is an electrophotographic recording media. By electrophotographic recording media, it is meant herein that the media is well adapted for electrophotographic printing processes. The term "electrophotographic printing" is meant to be understood broadly as including any number of methods that use light to produce a change in electrostatic charge distribution to form a photographic image including, but in no way limited to, laser printing. In some examples, the recording media is a photographic recording media. In other terms, the recording media can be used as a photographic recording media for electrophotographic printing devices. The media has thus the properties and appearances at least equal to the properties and appearance of silver halide photo media substrates when image is printed thereon.

Electrophotographic recording media often have specific features compared to conventional printing papers. Indeed, when conventional printing papers are used for electrophotographic printing, it can be difficult to obtain a print with superior image quality, especially high-gloss appearance compared with traditional silver-halide photographic printing. As a photo grade media, the gloss level is an important factor contributing to the image quality. To create a superior image effect in color electrophotographic printing, coated media are often used. However, the print quality of electrophotographic printing operations has often been limited by the characteristics of said coated print media. Indeed, these coated media are, in general, more problematic to achieve high gloss level and can become soften and sticky during toner fusing process in elevated temperature that brings jam defects. Furthermore, paper blister is common problem that can occur with many electrophotographic coated papers, often due to fusing processes required in such printing procedures. When toner images are transferred onto the paper, and the paper/toner combination undergoes fusing, the water absorbed inside the media is typically heated causing vaporization, thereby generating strong vapor pressure beneath the coating. If the vapor pressure cannot dissipate relatively instantly and homogenously along the paper surface, a "popcorn" effect can occur that causes blistering. This can be further exacerbated if the media is prepared or if printing occurs under higher humidity conditions. Further, if multiple heated fuser rollers are used or higher fusing temperatures are present to achieve high toner gloss, blistering can be even more pronounced. Additionally, when duplex printing using media that is coated on both sides, it is even more difficult for water vapor to escape from the media.

The electrophotographic recording media as described herein is a media that does not have this blistering effect. Furthermore, such recording media has a good surface smoothness and has a very high gloss appearance. Said media is an image-receiving media that shows excellent print image quality. Said recording media yield not only high gloss appearance but, further, provides a solution to keep the gloss stable under the heat, whether the printers are equipped with single or double heated fuser rollers. In some examples, the recording media has a non-imaged gloss which is above about 95 to 100% when tested at 75° angle per Tappi test method of T480, or which is above about 35 to 50% when tested at 60° angle.

The electrophotographic recording media, as described herein, has thus excellent gloss and excellent printing characteristics while not having any blistering effect. In some examples, the recording media can be used as a photographic printing paper. Such recording media is able to provide advantages such as low cost, glossy appearance, surface smoothness and excellent image quality when used to produce electrophotographic photographic printouts. In addition, the printable media described herein provides an excellent photobase paper feel. As used herein, the term "photo feel" means herein that that the printed image feels like a photographic silver halide material when touched.

Figure 1:
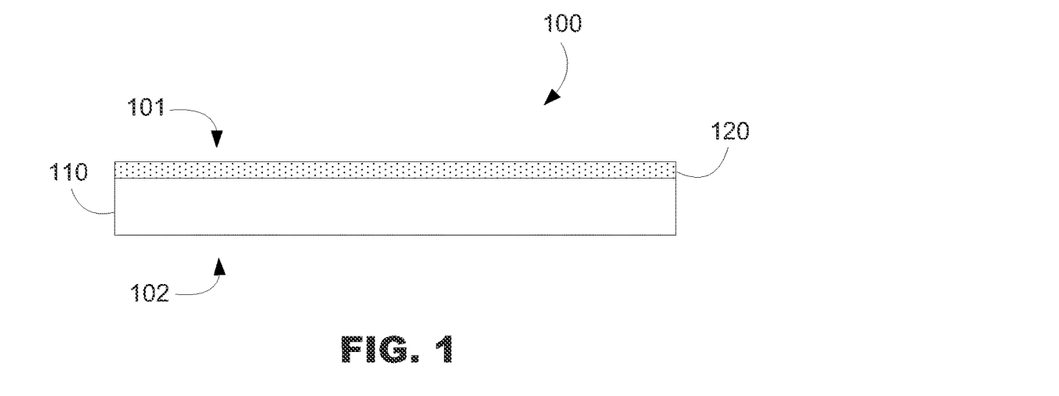
FIG. 1, FIG. 2 and FIG. 3 are cross-sectional views of a printable media according to embodiments of the present disclosure.
Figure 2:
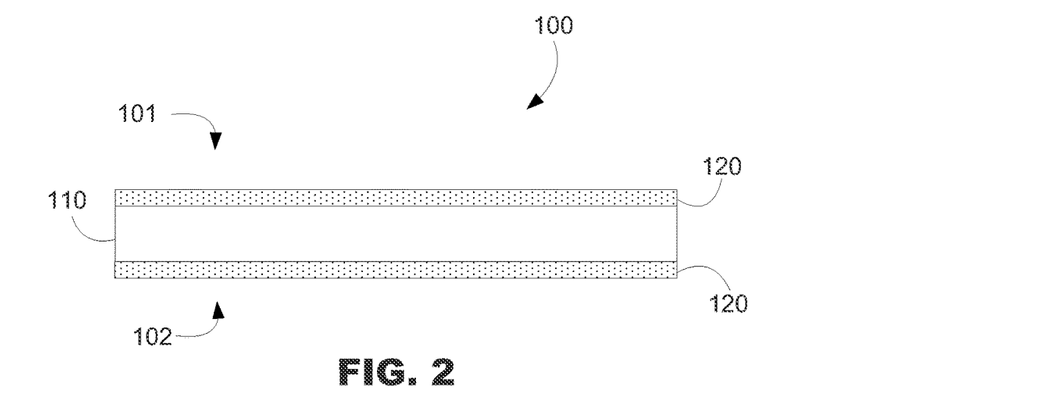
Figure 3:
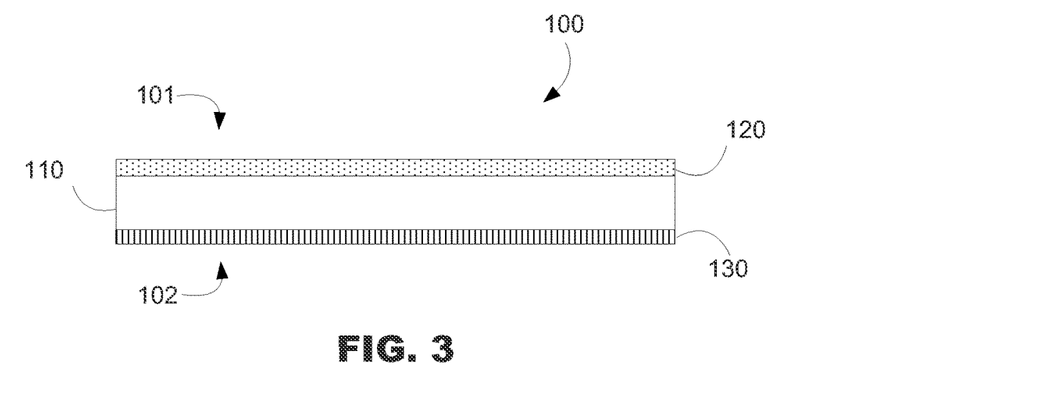

FIG. 1, FIG. 2 and FIG. 3 illustrate some embodiments of printable media (100). As will be appreciated by those skilled in the art, FIG. 1, FIG. 2 and FIG. 3 illustrate the relative positioning of the various layers of the printable media (100) without necessarily illustrating the relative thicknesses of the various layers. In some examples, as shown in FIG. 1, the printable media (100) encompasses a base substrate (110); said base substrate (110) can be a paper base substrate. The base substrate has two surfaces. A first surface, which is coated with image-receiving layer or toner-receptive layer (120), which might be referred to as the "image surface" or "image side" (101), and a second surface, the opposite surface, which might be referred to as the "back surface" or "back side" (102). FIG. 2 illustrates some other embodiments of the printable media (100). Such printable media includes image-receiving layers (120) that are applied on both sides of the base substrate (110). The image-receiving layers (120) are thus present on the back side (102) and on the image side (101) of the base substrate (110). In some other examples, as illustrated in FIG. 3, the printable media (100) includes a base substrate (110) wherein the image side (101) encompasses an image-receiving layer (120) and wherein the back side (102) encompasses a pigment coating layer (130).

The printable media (100) contains an image side (101), i.e. wherein the printable image is deposited, and a back side (102) which is not very well adapted to receive the printable image. Without being limited by any theory, it is believed that coating on the back side (102), when present, might serve to compensate for the presence of the image-receiving layer (120) on the image side (101) of the base substrate (110).

In some examples, the printable media is a well adapted for liquid electrophotographic printing device (i.e. using liquid electrophotographic toner such as, for example, HP Indigo Digital Press 5000). The electrophotographic recording media (100) can be an electrophotographic photographic recording media for liquid electro-photographic printing (LEP) and can be used in a method of forming photographic printed images, said method including applying a liquid toner on the image-receiving layer (120) of the photographic printing media (100). In some examples, when applying liquid toner, the image-receiving layer is treated and coated with a primer layer coating. In some other examples, electrophotographic recording media (100) can be a laser-jet electrophotographic photographic recording media well adapted for laser printing device. Said recording media can thus be used as a laser-jet photo paper and can be used in a method of forming photographic printed images, said method including applying solid toner, via laser-jet printing technique, on the image-receiving layer (120) of the photographic printing media (100).

In some examples, the base substrate (110) is a cellulose base paper substrate. Any kind of cellulose paper stock may be used as the base substrate. The base substrate (110) can be made of any suitable wood or non-wood pulp. Non-limitative examples of suitable pulps include any kind of chemical pulp, mechanical wood pulp, chemically treated ground pulp, CTMP (chemical thermo mechanical pulp), and/or mixtures thereof. In some examples, the base substrate (110) contains non-wood pulp such as pulp originating from bamboo, bagasse, kenaf, papyrus, etc . . . . Bleached hardwood chemical Kraft pulps may make up the main pulp composition. This pulp has shorter fiber structure (0.3-0.6 mm) than soft wood, which contribute to good mechanical strength of the finished paper. In some example, the substrate is a paper base substrate having a basis weight of about 100 to about 300 gram/m$^2$ (gsm). In some other example, the substrate is a paper base substrate having a basis weight of about 120 to about 180 gram/m$^2$ (gsm). The substrate can have a thickness in the range of about 100 μm to about 300 μm.

Fillers may be incorporated into the pulp, for example, to substantially control physical properties of the final coated paper. The filler particles fill in the void spaces of the fiber network and result in a denser, smoother, brighter and opaque sheet. Examples of the fillers include, but are not limited to, ground calcium carbonate, precipitated calcium carbonate, titanium dioxide, kaolin clay, silicates, plastic pigment, alumina trihydrate, and/or mixtures thereof. It is to be understood that any desirable amount of filler may be used. In some examples, the amount of filler ranges from about 0.1 wt % to about 25 wt % of the substrate, and in some other examples, the amount of filler ranges from about 5 wt % to about 20 wt % of the substrate. When preparing the paper base stock, internal and surface sizing may be used. This process may improve internal bond strength of the substrate fibers, and may control the resistance of the coated substrate to wetting, penetration, and absorption of aqueous liquids. In some examples, the fiber bond strength of the base substrate is ranging from about 250 to about 600 J/m$^2$. Without being linked by any theory, it is believed that if the bonding strength of the base stock is low, blister defect will generate under the heat of toner fusing action, where high temperature is locally applied on the media and evaporation of moisture inside media will break the fiber network with weak fiber bonding strength. Internal sizing may be accomplished by adding a sizing agent to the substrate in the wet end. Non-limitative examples of suitable sizing agents include rosin-based sizing agent(s), wax-based sizing agent(s), cellulose-reactive sizing agent(s) and other synthetic sizing agent(s), and/or mixtures. Included in this wet end processing can be additional functional additives such as but not limited to dispersants, biocides, retention aids, defoamers, dyes, and optical brighteners. It is to be understood that the type and amount of surface sizing agent(s) may substantially improve moisture resistance and may alter the stiffness of the base paper stock.

Surface sizing (i.e. apply sizing agent to the formatted paper roll) may be accomplished by film size press, pond size press and other surface techniques.

In some embodiments, the printable media (100) encompasses an image-receiving layer (120). In some examples, such as illustrated in FIG. 1, the image-receiving layer (120) is present on one side of the base substrate (110), i.e. on the image side (101) of the base substrate.

In some other examples, such as illustrated in FIG. 2, the image-receiving layer (120) is present on the back side (102)

and on the image side (101) of the printed media (100), i.e. on both sides of the base substrate.

By image-receiving layer, it is meant herein that the image-receiving layer is adapted to receive a printed image using electrophotographic printing device. In some examples, the image-receiving layer (120) is a laser-jet image-receiving layer. By laser-jet image-receiving layer, it is meant herein that the image-receiving layer is adapted to receive image printed using laser-jet technique. The laser-jet image-receiving layer can also be called dry toner recovering layer for electrophotographic printing. Such laser-jet techniques include, for examples, laser printing and electrophotographic printing technique using dry toner. Without being limited by any theory, it is believed that the image-receiving layer is specifically formulated to interact with the toner, perhaps being tailored to specific toner compositions, to improve the quality of the printed image.

In some embodiments, the image-receiving layer is a resin layer filled with inorganic pigments. Said resins are polymeric polyolefin resins. In some examples, the image-receiving layer is a continuous polymeric polyolefin resin coating layer. As used herein, the term polyolefin refers to a polymer produced by olefin homo-polymerization or copolymerization reaction via either high-pressure polymerization or low pressure in the presence of special catalyst like Ziegler and metallocene catalysts, where olefin refers to a hydrocarbon compounds containing a carbon-carbon double bond alkene with general formula $C_nH_{2n}$.

Examples of polyolefin resins include, but are not limited to, high density polyethylene (HDPE), low density polyethylene (LDPE), polypropylene (PP), polymethylpentene (PMP), and copolymers of ethylene with hexane, butane, and octane (linear low density polyethylene, LLDPE). The polyolefin resins can also be blends of these polymeric materials, such as HDPE/LDPE, LDPE/LLDPE, PP/LDPE, and PP/LLDPE. The polymeric polyolefin resins can thus be selected from the group consisting of polyethylene (PE), polypropylene (PP), polymethylpentene, polybutylene polymer and mixtures thereof. In some other examples, the polyolefin material is polyethylene, polypropylene or ethylene vinyl acetate polymer.

The polymeric polyolefin resin can also be a polyolefin copolymer. Examples of polyolefin copolymer include copolymer of polyethylene, propylene and ethylene such as hexene, butene and octene. In some examples, the modified polyolefin materials can be used, where modified polyolefin refers to small amount of functional co-monomer repeat units with no more than 10% by weight were polymerized on the macromolecule chains to modify chemical and physical properties of the polyolefin materials. Examples of modified polyolefin material include but are not limited to, acrylic grafted polyolefin such as polypropylene, polyethylene copolymer of vinyl acetate, ethyl methyl acrylate, ethylene ethyl acrylate, ethyl acrylic acid, ethyl glycidyl methacrylate, ethyl-n-butyl acrylate and mixtures thereof. In some examples, modified polyolefin material is a maleic anhydride and acrylic acid modified polyolefin such as modified polypropylene and modified polyethylene and mixtures thereof. In some example, polymeric polyolefin resins are high density polyethylene (HDPE), low density polyethylene (LDPE), linear low density polyethylene (LLDPE) and polypropylene (PP) homo-polymers, copolymers, and blends thereof. In some other examples, polymeric polyolefin resins are high density polyethylene (HDPE), low density polyethylene (LDPE) or linear low density polyethylene (LLDPE).

In some examples, polyolefin resin coating layer is a biaxially oriented; in some other examples, polyolefin resin coating layer is a biaxially oriented polyethylene or polypropylene. The thickness of the biaxially oriented sheet can be from 10 to 75 microns. Below 10 microns, the sheets cannot be thick enough to minimize any inherent non-planarity in the support and would be more difficult to manufacture. At thicknesses higher than 75 microns, little improvement in either surface smoothness or mechanical properties is seen, and so there is little justification for the further increase in cost for extra materials.

In addition, it may be desirable to use various additives such as antioxidants, slip agents, or lubricants, and light stabilizers in the plastic elements as well as biocides in the paper elements. These additives are added to improve, among other things, the dispersibility of fillers and/or colorants, as well as the thermal and color stability during processing and the manufacturability and the longevity of the finished article. In some examples, the polyolefin coating can contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), or combinations of the above, heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate, light stabilizers such as hindered amine light stabilizers (HALS), such as, for examples, poly {[6-[(1,1,3,3-tetramethylbutylamino }-1,3,5-triazine-4-piperidinyl)-imino]-1,6-hexanediyl [{2,2,6,6-tetramethyl-4-piperdinyl) imino]} (Chimassorb 944 LD/FL).

In some embodiments, the image-receiving layer composition contains a resin filled with inorganic pigments, said inorganic pigments being dispersed inside said continuous resin phase. The amount of inorganic pigments (also called fillers) represents more than about 20 wt % by weight of the total weight of the coating layer. In some other embodiments, the amount of inorganic pigments represents more than about 25 wt % by weight of the total weight of the coating layer.

In some examples, the inorganic pigments represent from about 20 wt % to about 50 wt % of the total weight of the image-receiving layer composition. In some other examples, the inorganic pigments represent from about 25 wt % to about 45 wt % of the total weight of the image-receiving layer composition. In yet some examples, the image-receiving layer composition that contains a resin filled with from about 25 wt % to about 40 wt % of calcium carbonate, is applied on top of the base substrate (110) by a non-solvent (aqueous or organic) coating process like extrusion-coating. Examples of inorganic pigments include, but are not limited to, calcium carbonate, zeolite, silica, talc, alumina, aluminum trihydrate (ATH), calcium silicate, kaolin, calcined clay and combinations thereof. In some other examples, the inorganic pigments are calcium carbonate. Calcium carbonate can be OMYACARB® 2SST from Omya, INC or Calcium Carbonate in master batch such as Polycal® from Heritage Plastic, Inc.

The ratio of the polyolefin resins to pigments (fillers) can be in any range as long as the polyolefin resins form a continuous phase and as long as the pigments are well dispersed in the resins. If the polyolefin resins do not form a continuous phase, but rather form isolated domain surrounding by fillers, the physical properties such as tensile strength, gloss level and surface smoothness can be compromised. However, if the resin is over dosage, the thermal performance is adversely affected which could cause the fuser jam during printing. In some examples, the ratio of resins to pigments ranges from about 80:20 to about 50:50; and, in some other examples, the ratio of resins to pigments ranges from about 75:25 to about 60:40.

In some examples, the image-receiving layer composition include polyolefin with melting index (Polyethylene) between 3 to 10 (g/10 min) per ASTM D1238-79 procedure, and process temperature from 280° C. to 350° C. In some other examples, the polyethylene used is Chevron 1017 from Chevron Phillips Chemical Company, and master batch Calcium Carbonate is Plastimin C1 from Heritage, INC.

The image-receiving layer (120) might further encompass additives in view of improving printing performances. In some examples, the image-receiving layer encompasses a polymer oligomer combination of oligomers. Such additives are believed to be able to improve printing sheet running ability by controlling the Coefficient of Friction (COF). The Coefficient of Friction (COF) is evaluated using the TMI slips and friction tester (model #32-90) per the TAPPI T-549 om-01 method. In some examples, the COF, of the image-receiving layer (120), is in the range of about 0.3 to about 0.5 in order to provide similar photo feel as silver halide photo. Since the continuous phase of the image-receiving layer is a polyolefin material that has very low surface energy, the toner adhesion is often concerned. Without being linked by any theory, it is believed that additives play a role to improve toner adhesion. The additive or combination of additives are compounded first and, thereafter, are extruded within the image-receiving layer. In some examples, the additives are selected by chemical groups that have the same molecular structure, i.e., the same repeated units in backbone chains, as the resin base that forms the continuous phase, such as the polyethylene or polypropylene oligomer to maximize the image performances by making two polymers compatible in molecular level. In some examples, the additive is a polyolefin oligomer. In some other examples, the additive is a modified polyolefin. Examples of the oligomer are oxidized polyethylene homopolymers, oxidized high density polyethylene homopolymers, oxidized polypropylene homopolymers, and oxidized linear low density polyethylene polymers. Oligomers of ethylene copolymerized with a polar monomer can be used. Examples of co-oligomers include ethylene-acrylic oligomer, ethylene-vinyl acetate oligomer, ethylene-maleic anhydride oligomer, and propylene-maleic anhydride oligomer. In some examples, a maleated polyolefin oligomer is used. The maleated oligomer can be low level ungrafted oligomeric and un-reacted maleic anhydride (referred to as unbounded) or mixed with oligomer grafted maleic anhydride side chains (referred to as bounded). The ratio of bounded to unbounded maleic anhydride, as measured by saponification number measured in mg KOH/g of the product (ASTM D-1386; Standard Test Method for Acid Number (Empirical) of Synthetic and Natural Waxes) can be, in some examples, in the range of about 100:5 to about 100:150, and, in some other examples, in the range of about 100:15 to about 100:50.

In some examples, the oligomers have a molecular weight ranging from about 500 to about 10,000 and, in some other examples, ranging from about 700 to about 5000. The amount of oligomers is depending on its molecular structure and molecular weight, as well as the final performance requirements. In some examples, the amount of oligomers represents from about 0.0001 to about 2 wt % by weight of total polyolefin resins used in the image-receiving layer. Such additives can be added by any methods known in the prior arts such as micronization, emulsification, media milling and shock cooling.

In some embodiments, such as illustrated in FIG. 3, the electrophotographic printable media (100) includes a base substrate (110) wherein the image side (101) of the base substrate encompasses an image-receiving layer (120) and wherein the back side (102) of the base substrate encompasses a pigment coating layer (130). Without being linked by any theory, it is believed that this pigment coating layer creates a porous structure that is able to reduce the thermal blister during fusing and that is able to improve media running ability in the printing process. The pigment coating layer composition can include inorganic pigments, polymeric hollow particle pigments, binders and/or a charge control additive. The pigment coating layer may contain synthetic polymer such as, for example, an acrylic-styrene emulsion polymer such as Acrona®S728 available from BASF, Inc. The pigment coating composition may also contain water soluble metallic salts such as sodium chloride or calcium carbonate from Aldrich Inc and a slip aid such as, for example, Michem® Emulsion 29235 available from Michelman Inc. The pigment coating layer composition may also contain optical brightness agent such as Leucopher® LS (from Clariant Inc), and other coating aids such as PH control, biocides, color dye and surfactant. In some examples, the pigment coating layer composition includes binders. Without being linked by any theory, it is believed that said binders could supply the adhesion forces between base paper stock and the pigments, as well as binding of pigment particles to each other. The amount of binders that can be added provides a balance between binding strength and maintaining particulate surface voids and inter-particle spaces. Examples of suitable binders include water-soluble polymers such as polyvinyl alcohol, starch derivatives, gelatin, cellulose derivatives, acrylamide polymers, acrylic polymers or copolymers, vinyl acetate latex, polyesters, vinylidene chloride latex, styrene-butadiene or acrylonitrile-butadiene copolymers. In some other examples, binders include, but are not limited to, polyvinyl alcohols and water-soluble copolymers thereof, e.g., copolymers of polyvinyl alcohol and poly(ethylene oxide) or copolymers of polyvinyl alcohol and polyvinylamine; cationic polyvinyl alcohols; aceto-acetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof. Examples of binders include Mowiol®20-98 and Mowiol®40-88 (products of Kuraray and Clariant). The amount of binders used in the formulation is related with type and amount of pigments and is measured by "wet-picking" and "dry-picking" strength, in conjunction with total performance of coated paper and printing quality. The wet-picking and dry-picking strength refers that the adhesion strength of coating layer against localized delaminating from the underlying substrate during manufacture procedure (wet-picking) and printing and post-printing usage and storage (dry-picking) In some examples, the binder may be present in an amount representing from about 5 wt % to about 30 wt % by total weight of the pigment layer and, in some other examples, in an amount representing from about 10 wt % to about 15 wt % by total weight of the pigment layer. The pigment coating layer (130) may further include optional additives such as mordants, biocides, optical brightener, surfactants, plasticizers and cross linking agents. Crosslinking agents for polyvinylalcohol might include boric acid, borax, glyoxal, glutaraldehyde, formaldehyde, etc. In some examples, the solids content of the pigment coating layer compositions ranges from about 60 to about 75 percent by weight (wt %) with a viscosity from about 1000 to about 1500 centipoise (cps) as measured by a low shear Brookfield viscometer at a speed of 100 revolutions per minute (rpm), or from about 30 cps to about 40 cps at a higher shear rate of 4500 rpm using a high shear Hercules viscometer.

In some embodiments, the electrophotographic recording media (100), such as defined herein, is produced by applying an image-receiving layer (120) on the image side (101) of a base substrate (110) within an extrusion process. In some examples, the method for making said electrophotographic recording media encompasses extruding an image-receiving layer (120), containing a polymeric polyolefin resin and more than about 20 wt % of inorganic pigments dispersed into said resin, onto the image side (101) of a base substrate (110). In some other embodiments, the printable media (100) can be produced by applying an image-receiving layer (120) on the image side (101) of a base substrate (110) by extrusion process and by applying a pigment coating layer (130) on the back side (102) of said base substrate (110). A method for making an electrophotographic recording media can thus encompass extruding an image-receiving layer containing a polymeric polyolefin resin and more than about 25 wt % of inorganic pigments dispersed into said resin, onto the image side of a base substrate, and applying a coating composition onto the back side of said base substrate. The pigment coating layer can be coated using rod, blade, roll, air knife, slot die, curtain coaters.

In yet some other embodiments, the printable media (100) can be produced by applying an image-receiving layer (120) on the image side (101) and on the back side (102) of the base substrate (110) by an extrusion process. In yet some other examples, the method for making an electrophotographic recording media encompasses extruding an image-receiving layer (120), containing a polymeric polyolefin resin and more than about 25 wt % of inorganic pigments dispersed into said resin, on both sides of a base substrate (110), i.e. onto the image side and onto the back side of said base substrate.

In some examples, the image-receiving layer (120) is extrusion coated onto the base substrate (110) with a coat weight ranging from about 5 to about 50 grams/meter$^2$ (gsm), in some other examples, with a coat weight ranging from about 10 to about 35 gsm, or in yet some others examples, with a coat weight ranging from about 15 to about 25 gsm. In some examples, the coat weight of the image-receiving layer can be from about 10 to about 15 gsm for each coating layer on each side of the base substrate (110).

The image-receiving layer (120) can be applied onto the substrate according to various extrusion operations like extrusion coating, lamination, hot melt extrusion or modification of cast extrusion or coating operation. In some examples, the image-receiving layer is applied onto the base substrate with the use of a heat melted extrusion coating processing. Any coating processes that include aqueous solvent, aqueous dispersion or require any organic solvent are excluded from the scope of this invention. The image-receiving layer can be laminated either on one side or on both side of the substrate.

In some examples, the image-receiving layer (120) is formed by a co-extrusion process. The image-receiving layer can also be made by hot melt extrusion technique. As used herein, the terms extrude and hot melt extrusion refer to process wherein the material is heated to a temperature at, or above, its melting point and deposited on a moving substrate at a uniform thickness. In some examples, in the extrusion process, the material is heated to a considerably higher temperature than its melting point. The extrusion process may be practiced within a wide range of extrusion temperatures, for example, from about 310° C. to about 350° C. in case of polyethylene, and speeds, for example, from about 60 m/min to about 460 m/min, depending on the particular intended application of the material. In some examples, the extrusion temperature ranges from about 280° C. to about 320° C. in case of polypropylene. In such extrusion processes, the component of the image-receiving layer is first subjected to heat and pressure inside the barrel of an extruder. The molten polymer is then forced through the narrow slot of an extrusion-coating die by an extruder screw. At the exit of the slot die, a molten curtain emerges. In some examples, this molten curtain is drawn down from the die into a nip between two counter-rotating rolls, a chill roll and pressure roll. In some other examples, while coming into contact with a faster moving substrate in the nip formed between the chill roll and the pressure roller, a hot film is drawn out to the desired thickness, forming a layer with a specific thickness onto the substrate.

The inorganic pigments (fillers) can be added directly from an extruder hopper together with the polymeric polyolefin resin materials and with functional additives (when present), or alternatively, inorganic pigments are compounded off-line to create a filler enriched master batch. This master batch is then combined in the extruder hopper with other master batches containing other needed additives to produce the complete extrusion film recipe. The film is non-solvent (aqueous or solvent) coated to raw base paper to produce an optimized electrophotographic printing media.

In some examples, the image-receiving layer is extruded using a screw-type extruder. The feed hopper receives a continuous polymeric polyolefin resin materials and more than about 20 wt % of pigments master batch, the ingredient are mixed together. In some examples, the pigments master batch is Calcium Carbonate master batch. The polyolefin resin material can be in pallet form at 20° C., and can deliver a uniform molten flow at about 330° C. in the case of low density polyethylene to the extruder slot die.

In some examples, in a horizontal barrel, the material flow thought channel in which pellet conveying, compaction, melting, mixing, metering, and pumping occurs. The molten resin can then be passed through a screen pack filter or screen changer to remove impurities, and a variable valve to create an additional pressure restriction to control or vary resin residence time in the extruder screw channel The molten resin can finally proceed to the slot die. Material is spread in full width in a slot die and deposited on the travelling raw base web. The coated material with raw base is cooled by passing through a chill roll. The surface finish of the image-receiving layer coating is mirror imaged from the surface finish of the chill roll. Before the raw base reaches the extrusion die section, the paper surface can be treated using Corona charge to improve adhesion between the base and the image-receiving layer.

In some examples, the pigment coating layer (130) is applied to the back side (102) of the base substrates (110). The pigment coating layer (130) can be applied using an on-machine or off-machine coater. Examples of suitable coating techniques include slotted die application, roller application, curtain coater, blade application, rod application, air knife application, gravure application, airbrush application, and others known in the arts.

In some examples, the pigment coating layer (130) is applied onto the base substrate (110) with a coat weight ranging from about 5 to about 30 grams/meter$^2$ (gsm) or with a coat weight ranging from about 10 to about 15 gsm. The solids content of the pigment coating layer (130) can range from about 20 wt % to about 65 wt % depending on coating method used, with a viscosity of about 100 cps to about 1500 cps as measured by low shear Brookfield viscometer at a speed of about 100 rpm. The coat layer can then be dried by convection, conduction, infrared radiation, atmospheric exposure, or other known method.

In some examples, after coating the base stock with the pigment coating layer (130), a calendaring process can be used to achieve desired gloss or surface smoothness. The calendaring device can be a separate super calendaring machine, an on-line soft nip calendaring unit, an off-line soft nip calendaring machine, or the like. Super-calendering is calendering in a calender unit in which nips are formed between a smooth-surface press roll, such as a metal roll, and a roll covered with a resilient cover, such as a polymer roll. The resilient-surface roll adapts itself to the contours of the surface of paper and presses the opposite side of paper evenly against the smooth-surface press roll. Any of a number of calendering devices and methods can be used. The calendering device can be a separate super-calendaring machine, an on-line calendaring unit, an off-line soft nip calendaring machine, or the like. Some calendering systems do not require the paper to be as completely dried as other forms of calendering. In some examples, the calendering is carried out at a temperature ranged from about 50 to about 150° C. (metal roll surface temperature) and, in some other examples, at about 80 to about 110° C. In some examples, the nip pressure can be any value between about 100 to about 500 KN/cm$^2$. In some examples, when the pigment coating layer (130) is applied with a calendering device, the pigment coating layer (130) will be applied first and then the image-receiving layer (120) will be applied using extrusion techniques.

The electrophotographic recording media (100) obtained with the method described above presents very high gloss appearance, high surface smoothness, true photo paper feel and no blistering issues.

In some embodiments, the present disclosure refers to a process for producing an image on an electrophotographic recording media. In some examples, the printing process encompass providing an electrophotographic recording media; applying toner to form an image on the surface of said media and treating said media with heat to fuse the toner to the media. Said electrophotographic recording media encompasses a base substrate coated on at least one side with an image-receiving layer that contains a polymeric polyolefin resin and more than about 20 wt % of inorganic pigments dispersed into said resin. The electrophotographic recording media can be passed between oil-coated or non-oil-coated heated rollers to fuse the toner to the media. As toner, it is meant herein any solid ink that contains a binder resin and colorant particles; said toner can be magenta, cyan, yellow, or black colored or any other colors.

In some examples, the electrophotographic printing process involves electrically charging a photoconductive surface of a drum or belt in the printing device (copier, printer, etc.). Light is directed at the photoconductive surface to form a latent image. The latent image on the photoconductive surface comprises electrostatic charges replicating the image that will be printed onto the media. Toner particles are brought into contact with the photoconductor, and the particles are attracted to the charged regions on the photoconductive surface. As the recording media passes over the toner-containing photoconductive surface, the toner particles are transferred to the media. The toner image then can be fixed by briefly heating the media. The heat fuses the toner to the media creating a final imaged product. In some examples, electrophotographic recording media passes between heated fuser rollers. Many color copiers and color laser printers contain fuser rollers coated with oil (e.g., silicone oil) to prevent smearing of the image and sticking of the imaged media to the surface of the roller.

In some other embodiments, the present disclosure refers to a method of forming printed images on an electrophotographic recording media printable including a substrate with an image side and a back side, wherein the image side encompass an image-receiving layer, said image-receiving layer comprising a polymeric polyolefin resin and more than about 25 wt % of inorganic pigments dispersed into said resin, wherein the method encompasses applying solid toner via electrophotographic technique onto said media to form the desired printed image.

The printed images, resulting from such printing techniques, are photographic printed image and present high image quality, a good surface smoothness and have a very high gloss appearance.

The preceding description has been presented to illustrate and describe embodiments of the present invention. Although certain example methods, compositions, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

EXAMPLE 1

Preparation of Electrophotographic Printing Media

Different electrophotographic printing media each including a base paper, a back side coating layer and an image coating layer are prepared. The base paper, such as described in table I, is prepared using wood-free pulps containing 15 wt % filler (CaCO3). The thickness of the base paper stock is 165 μm. The internal bond strength is measured using Z-directional Tensile Strength (per Tappi method T541) and is expressed in lb/in$^2$. The paper surface strength measured using Wax pick strength is greater than 18 (per Tappi method of T459). The roughness of the raw base used is less than 3.5 μm per Park Print Surface method (Tappi method T555).

TABLE I

| Base paper stock type | Base stock paper weight (g/m$^2$) | Internal bonding strength (lb/in$^2$) |
|---|---|---|
| Wood-free pulps with 15 wt % CaCo3 | 171 gsm | ~75 |

The base paper is back side coated with a blade coater. The composition of the back side coating layer is illustrated in the Table II. The back side base coating layer composition is prepared by admixing the component of Table II, in a mixing tank for 30 minutes. Liex® PX9330 is a binder (SBA) available from Polymer Latex Inc. Moviol® 6-98 is a binder (PV-OH) available from Sigma Aldrich Inc.

Alcogum® L265 is a thickener available from Akzonobel. In Table II, all percentages are expressed by weight percentage (wt %) based on the total weight of the back side base coating composition.

TABLE II

| Ingredient | Parts by weight |
| --- | --- |
| Ground Calcium Carbonate Slurry | 52.0 |
| Precipitated Calcium Carbonate Slurry | 34.0 |
| Litex ® PX9330 | 12.0 |
| Moviol ® 6-98 | 1.0 |
| Alcogum ® L265 | 0.1 |
| Others (OBA, deformer etc) | 0.9 |

Different image-receiving layer compositions are prepared in accordance with the formula such as illustrated in the Table III below. All percentages are expressed by weight percentage (wt %) based on the total weight of the image-receiving layer composition. Different image-receiving compositions (A, B, C and D) are prepared by, first, admixing the pigments (Calcium Carbonate and Clay) with the polyolefin resin. The pigments (fillers) are added to the polyolefin resin by first compounding off-line to create a filler enriched first master batch. The first master batch is then combined in an extruder hopper with a second master batches in view of producing the complete extrusion film recipe.

TABLE III

| Ingredient | Example a | Example b | Example c | Example d |
| --- | --- | --- | --- | --- |
| Calcium Carbonate | — | 10% | 25% | 40% |
| Calcined clay | 5% | — | — | — |
| Calcium silicate | 7% | — | — | — |
| polyolefin resin: LDPE | Up to 100% | Up to 100% | Up to 100% | Up to 100% |

EXAMPLE 2

Electrophotographic Recording Media Performances

Electrophotographic recording media (A, B, C and D) are produced. The image-receiving layers (a, b, c and d), such as illustrated in table III, are extruded onto the base paper (as illustrated in Table I) in view of producing recording substrates for electrophotographic printing. The application is done using a screw type pilot extruder at 5 to 10 meter per minute. A high gloss mirror image chill roll is used. The extruder temperature profile was set as 190° C. at Zone I to die at 300° C. The coating layer, such as illustrated in table II, is then applied on the back side of the base substrate with a blade coater.

Electrophotographic recording media (A, B, C and D), each having the base substrate as illustrated in table I, the back side coating layer as illustrated in table II and different image-receiving layer (a, b, c and d) such as illustrated in table III, are evaluated for their gloss stability, their anti-blister and their printing performance using a Hewlett-Packard color laser printer CLJ-9500 under "heavy gloss paper" fusing model. The printer and tested media are first pre-acclimated in an environmental chamber of with temperature 30° C. and 80% relative humidity.

Surface Gloss

Gloss stability tests are made by measuring the gloss difference before and after fusing on the un-image area. The surface gloss of each media sample is measured using a Micro Tri-Gloss Meter (available from BYK Gardner, Inc.) according to the standard procedures described in the instrument manual provided by the manufacturer. The surface gloss is measured on 8.5"*11" non-imaged (i.e., non-printed) sheets. The Micro-Tri Gloss Meter is calibrated at sixty (60) degrees using the standard supplied by the unit. The sample was placed on a flat surface and the surface gloss is measured at sixty (60) degrees. The sheets are printed with an image using a Hewlett-Packard color laser printer CLJ-9500, and the surface gloss of the image on the sheet is measured using the foregoing method. The samples are printed with a test pattern image comprising colored squares. The test pattern includes squares of solid primary colors (cyan, magenta, yellow, and black), and blends of primary colors (red, green, and violet). Measurements are made on three (3) sample sheets, and the average value was reported in terms of gloss units (GU).

Print Quality

The media samples are fed through a Hewlett-Packard color laser printer CLJ-9500 using the bypass trays and imaged. The samples are printed with a test pattern comprising colored squares of solid primary colors (cyan, magenta, yellow, and black), and blends of primary colors (red, green, and violet). The printed samples are manually inspected to determine the overall quality of the printed image, and the samples are rated per the following scale: Excellent (No variation in gloss level between printed squares, and no visible print defects. Good: Minor variation in gloss level between printed squares and no visible print defects); Fair (Major variation in gloss level between printed squares and some visible print defects); Poor (Many visible print defects such as embossing marks); Jammed (Images could not be printed on the media because of sheet feeding problems (sheets jammed together)).

Blister Testing

Each of the coated media sheets A, B, C and D are subjected to a blister test. Color electrophotographic printer made by Hewlett-Packard (Hewlett-Packard color laser printer CLJ-9500), equipped with double heated rolls, is set to a "gloss model" setting, i.e., higher pressure and slower speed as the media passes the fusing rollers of the printer. The tests are carried out in an environmental chamber of 30° C. and 80% relative humidity. The printer is acclimated in the chamber for at least 72 hrs, and the coated media to be tested is acclimated for 24 hrs. The blister test pattern is a "dark blue" image that is a 200% toner (100% cyan toner and 100% yellow toner) coverage pattern across the whole sheets.

The results for gloss stability, anti-blister effect and printing image performances are illustrated in Table IV below.

TABLE IV

| Variants | Gloss | Blister | Print Quality |
| --- | --- | --- | --- |
| Ex. A | Initial high | Jammed | Poor |
| Ex. B | Initial high, dropping 18% after printing | None | Fair |
| Ex. C | Initial high, dropping 5-8% after printing | None | excellent |
| Ex. D | Initial high, dropping 1-3% after printing | None | excellent |

As it can be seen in Table IV above, blistering effect is absent when the media encompass an image-receiving layer containing Calcium Carbonate. Furthermore, excellent print quality and gloss performances are observed when the pigments are present in concentration above 20 wt % of the image-receiving layer formulation.

The invention claimed is:

1. An electrophotographic recording media, comprising:
a base substrate coated on an image side with an image-receiving layer that contains:
a polymeric polyolefin resin;
more than about 20 wt % of inorganic pigments dispersed into said resin, wherein the inorganic pigment is calcium carbonate;
a maleated oligomer having a ratio of bounded maleic anhydride to unbounded maleic anhydride ranging from about 100:5 to about 100:150, the bounded maleic anhydride being grafted to an olefin oligomer and the unbounded maleic anhydride being ungrafted to the olefin oligomer, wherein the olefin oligomer has a molecular weight ranging from about 500 to about 10,000;
wherein the image-receiving layer excludes aqueous solvent, excludes organic solvent, and is not an aqueous dispersion, and wherein said media has a non-imaged gloss that ranges from above about 95% to 100% when tested at 75° angle, or that ranges from above about 35% to 50% when tested at 60° angle; and
a pigment coating layer on a back side opposed to the image side of the base substrate.

2. The electrophotographic recording media of claim 1 wherein more than about 25 wt % of the inorganic pigments is dispersed into said polymeric polyolefin resin.

3. The electrophotographic recording media of claim 1 wherein the polymeric polyolefin resin is selected from the group consisting of polyethylene, polypropylene, polymethylpentene, polybutylene polymer and mixtures thereof.

4. The electrophotographic recording media of claim 1 wherein the polymeric polyolefin resin is high density polyethylene (HDPE), low density polyethylene (LDPE) or linear low density polyethylene (LLDPE).

5. The electrophotographic recording media of claim 1 wherein a ratio of the polymeric polyolefin resin to the inorganic pigments ranges from about 80:20 to about 50:50.

6. The electrophotographic recording media of claim 1 wherein the olefin oligomer represents from about 0.0001 wt % to about 2 wt % of a total wt % of the polymeric polyolefin resin.

7. The electrophotographic recording media of claim 1 wherein the olefin oligomer is a propylene oligomer.

8. The electrophotographic recording media of claim 1 wherein the coat weight of the image-receiving layer is ranging from of about 5 to about 50 gsm.

9. The electrophotographic recording media of claim 1 wherein the base substrate is a paper base substrate.

10. The electrophotographic recording media of claim 1 wherein the image-receiving layer is a laser-jet image-receiving layer.

11. A method for making an electrophotographic recording media, comprising:
extruding an image-receiving layer containing a polymeric polyolefin resin, more than about 20 wt % of inorganic pigments dispersed into said resin, and a maleated oligomer having a ratio of bounded maleic anhydride to unbounded maleic anhydride ranging from about 100:5 to about 100:150, onto the image side of a base substrate, wherein the image-receiving layer excludes aqueous solvent, excludes organic solvent, and is not an aqueous dispersion;
wherein the inorganic pigment is calcium carbonate;
wherein the bounded maleic anhydride is grafted to an olefin oligomer and the unbounded maleic anhydride is ungrafted to the olefin oligomer, wherein the olefin oligomer has a molecular weight ranging from about 500 to about 10,000;
and wherein said media has a non-imaged gloss that ranges from above about 95% to 100% when tested at 75° angle, or that ranges from above about 35% to 50% when tested at 60° angle.

12. A method for making an electrophotographic recording media, comprising:
extruding an image-receiving layer containing a polymeric polyolefin resin, more than about 20 wt % of inorganic pigments dispersed into said resin, and a maleated oligomer having a ratio of bounded maleic anhydride to unbounded maleic anhydride ranging from about 100:5 to about 100:150, onto the image side of a base substrate, wherein the image-receiving layer excludes aqueous solvent, excludes organic solvent, and is not an aqueous dispersion; and
applying a pigment coating layer on the back side of the base substrate;
wherein the inorganic pigment is calcium carbonate;
wherein the bounded maleic anhydride is grafted to an olefin oligomer and the unbounded maleic anhydride is ungrafted to the olefin oligomer, wherein the olefin oligomer has a molecular weight ranging from about 500 to about 10,000;
and wherein said media has a non-imaged gloss that ranges from above about 95% to 100% when tested at 75° angle, or that ranges from above about 35% to 50% when tested at 60° angle.

13. A process for producing an image on an electrophotographic recording media, comprising:
a. providing a media with a base substrate coated on one side with an image-receiving layer that contains a polymeric polyolefin resin, more than about 20 wt % of inorganic pigments dispersed into said resin, and a maleated oligomer having a ratio of bounded maleic anhydride to unbounded maleic anhydride ranging from about 100:5 to about 100:150, wherein the inorganic pigment is calcium carbonate, wherein the bounded maleic anhydride is grafted to an olefin oligomer and the unbounded maleic anhydride is ungrafted to the olefin oligomer, wherein the olefin oligomer has a molecular weight ranging from about 500 to about 10,000, and wherein the image-receiving layer excludes aqueous solvent, excludes organic solvent, and is not an aqueous dispersion, and wherein said media has a non-imaged gloss that ranges from above about 95% to 100% when tested at 75° angle, or that ranges from above about 35% to 50% when tested at 60° angle;
b. applying a pigment coating layer on a side opposite the one side of the base substrate;
c. applying a toner to form an image on the image-receiving layer of said media;
d. and treating the media with heat to fuse the toner to the recording media.

* * * * *

UNITED STATES PATENT AND TRADEMARK OFFICE
CERTIFICATE OF CORRECTION

PATENT NO. : 9,857,706 B2
APPLICATION NO. : 13/982198
DATED : January 2, 2018
INVENTOR(S) : Xiaoqi Zhou et al.

Page 1 of 1

It is certified that error appears in the above-identified patent and that said Letters Patent is hereby corrected as shown below:

On the Title Page

In item (57), Abstract, in Column 2, delete "An electrophotographic recording media containing a base substrate coated on at least one side with an image-receiving layer that contains a polymeric polyolefin resin and more than about 20 wt % of inorganic pigments dispersed into said resin. Also disclosed is a method of 5 making such recording media and process for producing an image on said electrophotographic recording media." and insert -- An electrophotographic recording media contains a base substrate coated on at least one side with an image-receiving layer that contains a polymeric polyolefin resin, more than about 20wt% of inorganic calcium carbonate pigment dispersed into the resin, and a maleated oligomer having a ratio of bounded maleic anhydride to unbounded maleic anhydride ranging from about 100:5 to about 100:150. A method of making the recording media includes extruding the image-receiving layer onto the image side of a base substrate, and a process for producing an image on the recording media includes applying a toner on the image-receiving layer to form an image and treating the media with heat to fuse the toner to the recording media. --, therefor.

Signed and Sealed this
Third Day of July, 2018

Andrei Iancu
*Director of the United States Patent and Trademark Office*